Nov. 19, 1935.   J. H. HAMMON   2,021,778
OPHTHALMIC LENS AND METHOD OF MAKING THE SAME
Filed Feb. 24, 1933

INVENTOR.
James H. Hammon.
BY
ATTORNEYS.

Patented Nov. 19, 1935

2,021,778

UNITED STATES PATENT OFFICE 2,021,778

OPHTHALMIC LENS AND METHOD OF MAKING THE SAME

James H. Hammon, Vincennes, Ind.

Application February 24, 1933, Serial No. 658,396

7 Claims. (Cl. 88—54)

My invention relates to ophthalmic lenses and method of making the same. It has to do with the production of an ophthalmic lens which will be substantially free from astigmatic errors or spherical aberration. It pertains to single vision lenses and to the various fields of multifocal lenses.

In the past, ophthalmic lenses have, in most cases, been designed substantially upon the same principles as lenses for use in optical instruments. Such practice fails to give consideration to the fact that practically all lenses for use in optical instruments have to do with the formation of images that lie on a plane at right angles to the axis of its optical system, whereas ophthalmic lenses are for the purpose of forming images upon a curved surface, namely, upon the retina. Such practice also fails to give consideration to the fact that the eye is constantly moving from one position to another in its attempt to secure direct vision.

It has been recognized that most ophthalmic lenses produce astigmatic errors. However, practically all efforts to correct such astigmatic errors have involved alteration or revision of the lens as a whole, that is, by alteration or revision of the anterior and posterior curves of the lens for the dual purpose of correcting the astigmatic errors and at the same time obtaining the proper refractive powers for the lens. Some effort has been made to form the front curve of the lens about a center of curvature coincident with the supposed point of rotation of the eye in its movement vertically or horizontally but this effort has mainly been based upon the erroneous theory that the eye rotates about a fixed center within the eye-ball.

The failure of this effort has been evidenced by the development and marketing of so-called "corrected" lenses. The designers of such lenses have taken cognizance of the fact that the front surfaces of lenses previously marketed have sine errors and the so-called "corrected" lenses were ordinarily designed to correct these sine errors by distorting the front curves of the lenses or by a selected relation of the front and rear surface curvatures. Substantially complete elimination of astigmatic errors is not effected by these "corrected" lenses. Moreover, the only claim made for these "corrected" lenses is that astigmatic errors are reduced for direct vision in limited zones. And no claim is made that such errors are reduced for indirect vision.

My invention recognizes that the occurrence of astigmatic errors in ophthalmic lenses is due practically entirely to the incorrect curvature of the front surfaces of such lenses. Thus, it divorces the question of refractive power of the lens from the problem of correcting astigmatic errors in lenses which are designed for ophthalmic purposes. It is based, in part, upon the recognition by me that such astigmatic errors produced within the eye by ophthalmic lenses, are so produced by rays of light which are in such oblique relation to the front surface of the lens that they are caused to enter the eye at angles which make them form circles of diffusion.

My invention is further based on the fact that the formation of these circles of diffusion within the eye will be eliminated if the front surface of the lens is given a curvature so that the iris of the eye will exclude the rays of light which approach the front surface of the lens at such an oblique angle that their subsequent entrance into the eye would produce these circles of diffusion. It is further based on the fact that if this front surface of the lens is given such a curvature, those rays of light from an object point in the field of direct vision which are not thus excluded by the iris will strike the front surface of the cornea normal thereto and will enter the normal eye as a small bundle of rays in substantial parallelism to the visual axis of the eye while those rays of light from an object point in the field of indirect vision which are not thus excluded by the iris will strike the front surface of the cornea normal thereto and will enter the normal eye as a small bundle of rays in substantial parallelism to a line drawn from the image point through the optical center of the eye.

However, still referring to the normal eye which needs no refractive correction, owing to the fact that the eye-ball moves to various positions in an effort to obtain direct vision of various objects, it is evident that the visual axis of the eye is constantly changing its position. It is equally evident that those rays of light which are picked up from any object point in the direct field of vision and which enter the eye must pass through the front surface of the lens so that if no rear surface were needed for correcting errors of refraction they would strike the front surface of the cornea substantially normal thereto and enter the eye substantially parallel to the visual axis thereof. It is equally evident that such rays of light as come from objects in the indirect field of vision and enter the eye must so approach the outer surface of the lens that if no rear surface were needed for correcting errors of refraction they would strike the front surface of the cornea normal thereto and in substantial parallelism with a line drawn from the image point through the optical center of the eye. In other words, the anterior surface must have such a curvature that these conditions would automatically occur whenever the eye assumed a new position, provided no refractive correction were needed and no posterior surface were provided.

It will be subsequently pointed out that with an abnormal eye, that is, an eye requiring refractive correction these rays which strike the cornea normal thereto will not all focus at the proper point on the retina, in the absence of a posterior surface of a curvature designed to correct this error in focus. For the present, however, it will be more clear if the effect of this posterior surface is ignored, since in my invention its function is merely the correction of refractive errors in the abnormal eye. The anterior surface is the surface upon which I rely to eliminate the astigmatic errors or spherical aberrations in the lens.

In order to insure that the rays of light which are picked up from an object and enter the eye in the field of direct vision would be substantially parallel with the visual axis of the eye in any position which the eye assumes, if the eye were normal and no refractive correction needed, it is necessary that the anterior surface of the ophthalmic lens be of a curvature developed about a center which is substantially coincident with the point from which the eye is moved in its various excursions. Therefore, the point from which the eye is moved in such various excursions must first be located with substantial exactness in order to determine the location of the center of curvature of the front surface of the lens.

By extensive investigations, I have determined that the point where this movement of the eye commences is not within the eye-ball but lies a substantial distance behind the retina. As a matter of fact, my investigations show conclusively that this point lies substantially where the optic nerve commences to bend when the eye starts its excursions. The movement involves a bending of the optic nerve which is made possible by the yieldable character of the fatty tissue around and behind the eye-ball and which results in a swinging movement that is continuous from the entrance of the optic nerve through the foramen of the orbit to the front surface of the eye-ball. Therefore, there is no fixed point of rotation in relation to the orbital walls.

By my investigations, I have determined that this point from which the normal eye movements are controlled is practically seventeen (17) millimeters behind the retina. In order to determine, in the normal eye, the radius of the front curve of the lens to be produced, the length of the eye-ball of the patient must be determined and this, together with the distance from the first principal focus to the apex of the cornea must be added to this seventeen (17) millimeters.

However, the length of the eye-ball varies with the patient, even in the normal eye. I determine this length by measuring the curvature of the front surface of the cornea and determining the correct length of the eye-ball for such a cornea by calculating the focus of this curvature whose focal point should lie on the retina, it being understood that where the anterior surface of the cornea has various radii the mean curve is taken.

In the following table the calculations are made with a range extending from eye-balls whose anterior surface of the cornea extend by full dioptric steps from thirty (30) diopters to fifty (50) diopters inclusive. These are in column one. In column two is indicated the radial curvature of each. In column three is given the distance of the macular or focal point behind the front surface of the cornea in the corresponding eyes which have no error of refraction. In column four is given the center of development of a front spherical surface of my lens for each of the corneal dimensions in column one, it being evident that the gradual change in the center of curvature in these front surfaces is of such a minute character that they may be grouped so as to make them practical without the necessity of carrying a great number of fronts.

| Cornea dioptric power | Radius of cornea | Diameter of normal eye-ball | Center of front of correcting lens |
|---|---|---|---|
| 30 | 11.2 | 33.33 | 64.33 |
| 31 | 10.8 | 32.25 | 63.25 |
| 32 | 10.5 | 31.25 | 62.25 |
| 33 | 10.19 | 30.30 | 61.30 |
| 34 | 9.89 | 29.41 | 60.41 |
| 35 | 9.61 | 28.57 | 59.57 |
| 36 | 9.34 | 27.77 | 58.77 |
| 37 | 9.09 | 27.03 | 58.03 |
| 38 | 8.85 | 26.31 | 57.31 |
| 39 | 8.62 | 25.64 | 56.64 |
| 40 | 8.41 | 25.00 | 56.00 |
| 41 | 8.20 | 24.39 | 55.39 |
| 42 | 8.01 | 23.80 | 4.80 |
| 43 | 7.82 | 23.25 | 54.25 |
| 44 | 7.64 | 22.72 | 53.72 |
| 45 | 7.47 | 22.22 | 53.22 |
| 46 | 7.31 | 21.73 | 52.73 |
| 47 | 7.15 | 21.27 | 52.27 |
| 48 | 7.01 | 20.83 | 51.83 |
| 49 | 6.86 | 20.40 | 51.40 |
| 50 | 6.73 | 20.00 | 51.00 |

Under preferred conditions, a lens made in accordance with my method has, for its front, a convex surface which is preferably spherical in form. However, toric or other type surfaces may be used without departing from my method. When a toric anterior surface is to be used, the point from which the eye starts to move is determined and the radius of a spherical curvature from such point is calculated. This then becomes the mean of the radii of the toric surface. A slight error inevitably arises in use of anterior surfaces of toric forms. However, even with such error, the conditions produced by the application of my method are markedly superior to the lenses produced by present known methods.

I have, so far, been discussing the normal eye, which of course, requires no refractive correction and wherein a ray of light striking the front surface of the cornea normal thereto will likewise strike the retina and produce the proper image thereon. But where the eye is abnormal in the sense that refractive correction is required, as is the case in practically every instance where ophthalmic lenses are required, the rays of light from the objects of regard must be made to strike the front surface of the cornea at a departure from normal. This departure from normal is accomplished by developing the proper curvature of the back surface of the lens and this will cause the light rays to strike the cornea so that they will form a proper image on the retina and thereby correct the error of refraction.

But it should be remembered that, with my invention, the anterior curvature of the lens is the first vital consideration. It is this curvature which determines whether or not the light rays, which are permitted by the iris to enter the eye, are properly directed as prescribed above. And if this anterior surface curvature is correct, the curvature of the posterior surface is merely developed to correct the error of refraction in the eye.

In other words, any ray which strikes the front surface will bend as it passes into the glass from the air, since it is passing from one medium into another. And the amount of the bending of the rays which subsequently are admitted into the eye is determined by the curvature of the front surface so that those rays will be directed towards the front surface of the cornea normal thereto. Moreover, since the front surface is developed from the same point as that from which the eye movements are controlled the same result will be had, in the absence of refractive correction, throughout all excursions of the eye.

Of course, the thickness of the lens as finally developed by the curvature of the back surface will further and finally determine the total degree of bending. But this additional factor merely compensates for any error of refraction in the eye being corrected and thus places the image on the retina where it would have been placed by the front curve if the eye had been normal and no refractive correction necessary.

For more clearly illustrating my method, I have appended hereto, more or less diagrammatic drawings of different types of lenses and in these drawings similar characters of reference designate corresponding parts.

Figure 1 is a diagrammatic horizontal section of a normal eye shown in connection with the spherical anterior surface of a lens or lens blank made in accordance with my invention and showing rays of light from an object point in the field of direct vision entering the eye substantially parallel with the visual axis and rays of light from an object point in the field of indirect vision entering the eye substantially parallel to a line drawn from the object point to the optical center of the eye.

Figure 2 is a diagrammatic vertical section of a normal eye shown in connection with the spherical front surface of a lens or lens blank made in accordance with my invention and illustrating rays of light from an object point in a field of direct vision through the marginal zone of the lens, these rays being shown entering the eye substantially parallel with the visual axis, also illustrating rays of light from an object point in a field of indirect vision shown entering the eye substantially parallel with a line drawn from the object point to the optical center of the eye.

Figure 5:
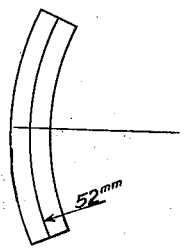

Figure 5 is a diagrammatic view of a lens blank in which a convex spherical front is effective four (4) millimeters behind the same as if developed at that point with a radius of fifty-two (52) millimeters and through which point the rear surface is to be developed and whose power will be the algebraic sum of the power of the front and rear surface as if tangent to one another on the apex of the rear surface.

Figure 6:
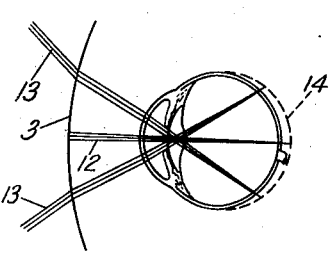

Figure 6 is a diagrammatic representation of an eye of selected dimensions and of abnormal form so that refractive correction is required, this eye being shown in conjunction with a curve representing the front spherical curve of a lens with this front curve being made in accordance with my invention so that the rays of light from object points within the direct and indirect fields of vision approach the front surface of the cornea normal thereto and enter the eye properly but, in the absence of the corrective posterior surface, such rays focusing at points behind the retina.

Figure 7:
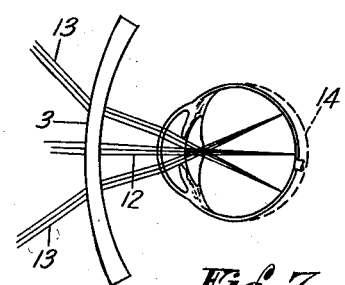

Figure 7 is a diagrammatic representation of the eye shown in Figure 6 and of a lens whose anterior surface has a curvature identical with that shown in Figure 6 but whose posterior surface has been developed to compensate for the refractive error and to properly focus the admitted rays of light at the retina.

Figure 8:
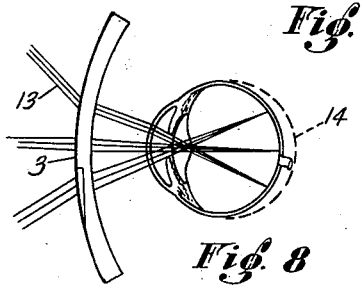

Figure 8 is a diagrammatic representation of an eye with a bifocal lens shown in conjunction therewith and illustrating the application of my invention thereto, with the curve of the front surface of both the distance field and the near vision field having its center of curvature located behind the eyeball and substantially at the point where the eye starts to move in its various excursions.

Figure 1:
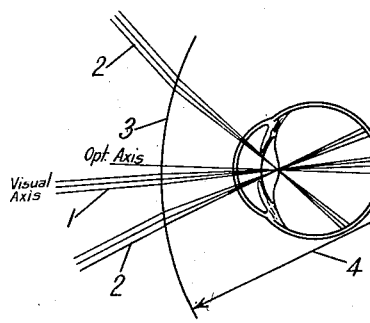

Referring more specifically to the drawing, it will be noted that Figure 1, which represents a horizontal cross section of a normal eye with the front surface of a lens disposed at the proper distance in front of it, also shows a series of rays of light 1 from an object in the direct field of vision and rays of light 2 from an object in the indirect field of vision. It will be noted that the rays of light 1, being from an object point in the direct field of vision enter the front surface of the lens and are bent by the front curve 3 thereof so that, in the absence of the rear surface, they would be directed towards the anterior surface of the cornea normal thereto. It will also be noted that, with these conditions and with a normal eye, these rays of light enter the eye in substantial parallelism with the visual axis thereof. Other rays of light which do not enter the anterior surface of the lens at such an angle that they would be directed towards the anterior surface of the cornea normal thereto will be bent at such an angle that they will be diaphragmed out by the iris and will not enter the eye at all.

It will also be noted by reference to this figure that the radius of curvature of the front surface of the lens is designated 4 and that it is fifty-five (55) millimeters in length. As shown in this figure, the center of curvature is located at 5 and this is the point substantially coinciding with the point from which the eye moves in its various excursions to different positions throughout the visual field.

Figure 2:
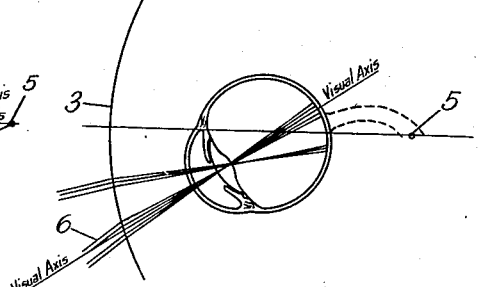

Figure 2 illustrates diagrammatically a vertical section of a normal eye in conjunction with the anterior surface curve 3 of the lens. In this figure, the eye is shown turned downwardly to view an object at a low elevation and the rays of light 6 are shown as being bent by the front surface of the lens so that they are directed towards the anterior surface of the cornea normal thereto and so that they enter the eye in substantial parallelism with the visual axis of the eye. It will further be seen that, owing to the fact that the anterior curvature is developed from a center point 5 substantially at the point from which the eye starts to move in its various excursions, the down-turned position of the eye and the viewing of an object through the marginal zone of the lens does not alter the fact that the rays of light from a direct object which ultimately enter the eye first pass through the front surface of the lens and are directed towards the anterior surface of the cornea normal thereto so that, in the absence of refractive correction, they would enter the eye in substantial parallelism with the visual axis.

It will also be understood that those rays from the same object which would not be directed by the front surface of the lens towards the cornea normal thereto, in the absence of refractive correction, do not enter the eye at all. They are diaphragmed out by the iris.

Figure 3:
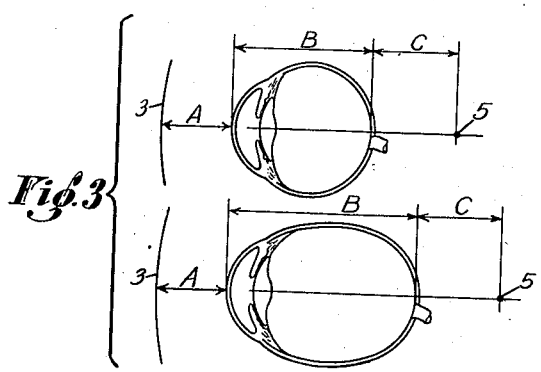
Figure 3 is a diagrammatic comparative showing of two eyes shown in connection with a spherical anterior surface of a lens or lens blank made in accordance with my invention, the showing of the different lengths of the eye-balls being exaggerated to illustrate the factors entering into the location of the center of curvature of the anterior surface of the lens in accordance with my invention.

Figure 3 illustrates a pair of eyes shown in conjunction with the front surfaces of lenses, wherein the curvatures of these front surfaces have been made in accordance with my invention. The eyes shown are both abnormal and the showing thereof is exaggerated to more clearly bring out the fact that the focal length of the cornea is different in one eye than in the other, as is the case in many eyes, even in the two eyes of the same patient.

This figure illustrates the three distances or lengths which are considered by me in determining the length of the radius of curvature of the anterior surface, though the showing of these lengths is merely illustrative and is not necessarily exactly correct in millimeters. Thus, the distance A corresponds to the anterior focus of the eye and in computing the length of the radius of curvature of the front surface, it should be approximately fourteen (14) millimeters. The distance B corresponds to the focal length of the anterior surface of the cornea and this distance will vary with the particular eye being fitted, as illustrated in an exaggerated way by the two eyes represented in this figure. The distance C corresponds to the distance from the retina to that point approximately seventeen (17) millimeters behind such retina, at which the center of curvature of the anterior surface of the lens is to be located.

It will be seen from this that the radius of curvature of the anterior surface of the cornea of two eyes of different length may vary and that that portion of the radius denoted by the measurement line B is the variable factor which must be taken into consideration in determining the radius of curvature of the anterior surface of the lens. By taking this into consideration, I am enabled to obtain accurate vision through all parts of the visual field.

Likewise, if the pair of eyes indicated in Figure 3 are considered as the two eyes of a single patient, the radius of curvature of the anterior surfaces of the two lenses prescribed for the patient should differ as indicated in this figure. If these differences are taken into account and the radii of curvatures are computed as indicated, lenses made in accordance therewith and having the proper refractive correction finally produced by the proper posterior surface will result in the production on the retinae of clear images of identical interpretative size so that the patient will be saved from a confused interpretation of the image of the object viewed.

Figure 4:
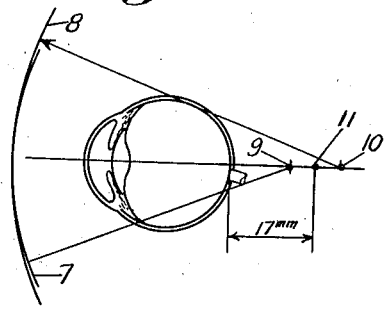
Figure 4 is a diagrammatic representation of an eyeball shown in connection with two curves which represent the two principal meridians of a toric anterior surface of the lens, with the curves shown in tangent relation to each other and with radius lines indicating the relation of the centers of curvature to the point from which the eye starts to move in its various excursions.

Figure 4 illustrates the manner in which the anterior surface of a toric lens is made in accordance with my invention. In this figure, a normal eye is represented and the principal meridian curves of the toric anterior surface are indicated at 7 and 8. It will be noted that the center of curvature 9 of the meridian curve 7 and the center of curvature 10 of the meridian curve 8 both lie behind the eye-ball. As a matter of fact, they both lie substantially equal distances on opposite sides of a point 11 which is substantially seventeen (17) millimeters behind the retina. It will be understood, also, that the variable focal length of the anterior surface of the cornea is taken into consideration in determining the proper position of the point 11 and that the distance from the apex of the cornea to the anterior focus of the eye is also added, as in the case of those lenses having spherical anterior surfaces.

In Figure 5, I have shown a lens blank diagrammatically and have shown how it is possible to produce a convex spherical front which is effective behind itself. Thus, this showing is of a blank whose convex spherical front is effective four (4) millimeters behind itself, as if developed at a point with a radius fifty-two (52) millimeters and through which point the rear surface is to be developed with a power indicated by the algebraic sum of the power of the front and rear surface as if tangent to one another on the apex of the rear surface.

Figure 6 illustrates an eye in conjunction with the front surface curve of a lens and with the rays of light from object points in both the direct and indirect fields indicated thereon. The rays of light from an object point in the direct field are shown at 12. The rays of light from an object point in the indirect field are shown at 13. The dotted line 14 indicates the proper position of the retina in a normal eye whose cornea has the anterior curvature shown. However, the eye-ball is short with the result that the rays of light shown would, the absence of refractive correction focus at a point behind the retina instead of on the retina. Thus, the curvature 3 of the anterior surface of the lens is properly made in accordance with my invention and would, in a normal eye, direct the rays of light towards the anterior surface of the cornea normal thereto, in the absence of the corrected rear surface of the lens. However, in view of the fact that the rays of light are not properly focused, owing to the shortness of the eye-ball, there must be provided a posterior surface on the lens which will further bend the rays of light to properly focus them upon the retina.

Figure 7 shows the eye-ball of Figure 6 in conjunction with a lens having an anterior surface 3 of the same curvature as the anterior surface indicated in Figure 6. However, Figure 7 shows, in addition, the posterior surface of the lens which is of such a curvature in relation to the anterior surface that the rays of light are further bent to correct the refractive error and properly focus the rays on the retina.

Figure 8 is a substantial duplicate of Figure 7, except that my invention is shown in connection with a bifocal lens. Thus, it will be noted that the anterior surface of the lens, which embodies the anterior surface of the near vision segment as well as the anterior surface of the distance vision portion, is indicated at 3 and is made in the same way as with a single vision lens.

It will be seen that I have provided a method of making ophthalmic lenses and a lens produced thereby which have numerous important advantages. In the first place, my invention makes possible the production of a lens which when properly placed before the eye will produce a clear and proper image upon the retina both of objects in the direct field of vision and of objects in the indirect field of vision and regardless of what portion of the lens the visual axis is passing through. Furthermore, my invention makes it possible to place in the hands of the person fitting the patient a comparatively few lens blanks with finished front surfaces, which few lens blanks will enable him to fit practically all patients with lenses which will be free from astigmatic errors or spherical aberrations.

It will also be apparent that my invention offers a simple and effective means for preventing the formation of images of different size upon the retinae of the two eyes of the patient. This is a problem which has been hitherto prevalent in the art and which is completely solved by this invention, so that the patient is free from the confusion arising from a conflict between these different size images.

It will also be apparent that I have, by my invention, made it possible to produce lenses wherein there are provided wider ranges of vision in which the objects of regard will produce clear and distinct images upon the retina of the eye.

Many other advantages of this invention will be obvious from the preceding description and the appended claims.

Wherever the term "anterior focus of the eye" occurs in this description and in the claims, it will be understood that this term is intended to mean the focal point which is approximately fourteen (14) millimeters in front of the apex of the cornea.

Having thus described my invention, what I claim is:

1. The method of making ophthalmic lenses for the correction of errors of refraction which comprises producing on a lens blank a finished spherical convex anterior surface whose radius of curvature is determined as to length by adding the posterior-anterior diameter of the eyeball presumed to be normal, the distance of the anterior focus in front of the apex of the cornea and the distance back of the macula to the foramen and using these combined distances as the radius whereby the said spherical lens surface will be effective to receive from points on the object of regard axial rays and a small bundle of rays in close proximity to each axial ray and direct them toward the pupil normal to the anterior surface of the cornea while so directing more oblique rays that they will be diaphragmed out by the iris of the eyeball, and then producing the finished posterior surface of the lens of such a curvature or curvatures with relation to the refractive power of the front surface and the error of refraction that the required refractive correction will be effected.

2. The method of making ophthalmic lenses for the correction of errors of refraction which comprises producing on a lens blank a finished spherical convex anterior surface whose radius of curvature is determined by adding the posterior-anterior diameter of the eyeball, presumed to be normal, as calculated by measuring the mean refractive power of the front surface of the cornea, the distance of the anterior focus in front of the apex of the cornea and the distance back of the macula to the foramen and using these combined distances as a radius whereby the spherical lens surface will be effective to receive from points on the object of regard axial rays and small surrounding bundles of rays and direct them towards the pupil normal to the anterior surface of the cornea while so directing more oblique rays that they will be diaphragmed out by the iris of the eyeball, and then producing the finished posterior surface of the lens of such a curvature or curvatures with relation to the refractive power of the front surface and the error of refraction that the required refractive correction will be effected.

3. The method of making ophthalmic lenses for the correction of errors of refraction which comprises producing on a lens blank a finished spherical convex anterior surface, whose center of curvature is located substantially 17 millimeters behind the retina and whose radius has a length determined by adding to such 17 millimeters, the length of the posterior-anterior diameter of the eyeball presumed to be normal and the distance of the anterior focus in front of the apex of the cornea whereby the said spherical lens surface will be effective to receive from points on the object of regard axial rays and a small bundle of rays in close proximity to each axial ray and direct them towards the pupil normal to the anterior surface of the cornea while so directing more oblique rays that they will be diaphragmed out by the iris of the eyeball, and then producing the finished posterior surface of the lens of such a curvature or curvatures with relation to the refractive power of the front surface and the error of refraction that the required refractive correction will be effected.

4. An ophthalmic lens for the correction of errors of refraction comprising a finished spherical convex anterior surface whose radius of curvature is determined as to length by adding the posterior-anterior diameter of the eyeball presumed to be normal, the distance of the anterior focus in front of the apex of the cornea and the distance back of the macula to the foramen and using these combined distances as the radius whereby the said spherical surface will be effective to receive from points on the object of regard axial rays and a small bundle of rays in close proximity to each axial ray and direct them toward the pupil normal to the anterior surface of the cornea while so directing more oblique rays that they will be diaphragmed out by the iris of the eyeball, and a finished posterior surface of the lens of such a curvature or curvatures with relation to the refractive power of the front surface and the error of refraction that required refractive correction will be effected.

5. An ophthalmic lens for the correction of errors of refraction comprising a finished spherical convex anterior surface whose radius of curvature is determined as to length by adding the posterior-anterior diameter of the eyeball presumed to be normal as calculated by measuring the mean refractive power of the front surface of the cornea, the distance of the anterior focus in front of the apex of the cornea and the distance back of the macula to the foramen and using these combined distances as the radius whereby the said spherical lens surface will be effective to receive from points on the object of regard axial rays and a small bundle of rays in close proximity to each axial ray and direct them toward the pupil normal to the anterior surface of the cornea while so directing more oblique rays that they will be diaphragmed out by the iris of the eyeball, and a finished posterior surface of the lens of such a curvature or curvatures with relation to the refractive power of the front surface and the error of refraction that required refractive corection will be effected.

6. An ophthalmic lens for the correction of errors of refraction comprising a finished spherical convex anterior surface whose center of curvature is located substantially 17 millimeters behind the retina and whose radius has a length determined by adding to such 17 millimeters the length of the posterior-anterior diameter of the eyeball presumed to be normal and the distance of the anterior focus in front of the apex of the cornea whereby the said spherical surface will be effective to receive from points on the object of regard axial rays and a small bundle of rays in close proximity to each axial ray and direct them towards the pupil normal to the anterior surface of the cornea while so directing more oblique rays that they will be diaphragmed out from the iris of the eyeball, and a finished posterior surface of the lens of such a curvature or curvatures with relation to the refractive power of the front surface and the error of refraction that the required refractive correction will be effected.

7. A lens blank designed for the production of an ophthalmic lens for the correction of errors of refraction comprising a finished spherical convex anterior surface whose radius of curvature is determined as to length by adding the posterior-anterior diameter of the eyeball presumed to be normal, the distance of the anterior focus in front of the apex of the cornea and the distance back of the macula to the foramen and using these combined distances as the radius whereby the said spherical surface will be effective to receive from points on the object of regard axial rays and a small bundle of rays in close proximity to each axial ray and direct them towards the pupil normal to the anterior surface of the cornea while so directing more oblique rays that they will be diaphragmed out by the iris of the eyeball.

JAMES H. HAMMON.